(12) United States Patent
Hash et al.

(10) Patent No.: US 6,349,116 B1
(45) Date of Patent: Feb. 19, 2002

(54) DATA COMMUNICATION SYSTEM HARNESSING FREQUENCY SHIFT KEYED MAGNETIC FIELD

(75) Inventors: Ronald J. Hash, Rogersville, TN (US); Douglas C. Bowman, Capitola, CA (US)

(73) Assignee: Wherenet Corp., Santa Clara, CA (US)

( * ) Notice: Subject to any disclaimer, the term of this patent is extended or adjusted under 35 U.S.C. 154(b) by 0 days.

(21) Appl. No.: 09/689,340

(22) Filed: Oct. 12, 2000

Related U.S. Application Data

(60) Provisional application No. 60/159,658, filed on Oct. 14, 1999.

(51) Int. Cl.[7] .............................. H04B 3/00; H04L 25/00
(52) U.S. Cl. ..................... 375/258; 375/272; 375/276
(58) Field of Search ............................... 375/257, 258, 375/272, 276, 303, 334

(56) References Cited

U.S. PATENT DOCUMENTS

| | | | |
|---|---|---|---|
| RE32,627 E | 3/1988 | Humble et al. | 340/572 |
| 5,103,459 A | 4/1992 | Gilhousen et al. | 375/1 |
| 5,432,841 A | 7/1995 | Rimer | 379/59 |
| 5,437,057 A * | 7/1995 | Richley et al. | 455/41 |
| 5,481,588 A | 1/1996 | Rickli et al. | 379/32 |
| 5,485,632 A | 1/1996 | Ng et al. | 455/51.2 |
| 5,561,701 A | 10/1996 | Ichikawa | 379/57 |
| 5,644,108 A | 7/1997 | Katsurahira et al. | 178/18 |
| B15,103,459 | 7/1999 | Gilhousen et al. | 375/206 |

* cited by examiner

*Primary Examiner*—Don N. Vo
(74) *Attorney, Agent, or Firm*—Allen, Dyer, Doppelt, Milbrath & Gilchrist, P.A.

(57) ABSTRACT

A non-propagating magnetic field-based communication system transmits and receives digital data within a limited coverage area environment. The system includes a compact transmitter unit, such as that contained in an 'tracking' tag affixed to an object, and a digital detector/demodulator unit. In order to generate and FSK-modulate a non-propagating magnetic field in accordance with modulation signals representative of the digital data, the transmitter unit contains a magnetic field coil and one or more capacitors controllably switched in circuit with the coil in accordance with the data, so as to change the resonant frequency of an inductor-capacitor transmitter resonant circuit. The receiver unit includes a magnetic field-sensing coil in circuit with a capacitor, to form a receiver resonant circuit that resonates at a frequency between the FSK frequencies modulated by the transmitter unit. A digital receiver/demodulator detects whether received frequencies are valid FSK frequencies and derives digital data using differences between valid detected FSK frequencies.

16 Claims, 3 Drawing Sheets

DATA COMMUNICATION SYSTEM HARNESSING FREQUENCY SHIFT KEYED MAGNETIC FIELD

CROSS-REFERENCE TO RELATED APPLICATION

The present application claims the benefit of copending provisional U.S. patent application Ser. No. 60/159,658, filed Oct. 14, 1999, entitled: "Data Communication System Harnessing Frequency Shift Keyed Magnetic Field," by R. Hash et al., assigned to the assignee of the present application, and the disclosure of which is incorporated herein.

FIELD OF THE INVENTION

The present invention relates in general to communication systems and components therefor, and is particularly directed to a non-propagating magnetic field-based communication system having a reduced hardware complexity magnetic field generator and detector arrangement, in combination with a frequency shift keyed (FSK) modulation scheme. The present invention is configured to facilitate the transmission and reception of digital data within a limited coverage area environment, between a compact transmitter unit, such as that contained in an 'tracking' tag affixed to an object, and a digital detector/demodulator unit.

BACKGROUND OF THE INVENTION

Although a variety of communication systems employ propagating magnetic fields, those which used non-propagating magnetic fields generated about a coil are less prevalent. As a non-limiting example, non-propagating magnetic fields may be employed in theft detection systems of the type installed in retail stores. Many of these systems, such as may be installed at the entry/exit of a retail establishment, are designed to convey only a single piece of data—the presence of a 'tagged' item. While others, such as 'smart' card systems, may convey more than one bit, the amount of information they are capable of transmitting and detecting is still relatively limited.

SUMMARY OF THE INVENTION

The present invention is directed to a non-propagating magnetic field based communication system, that is configured to provide for simplex digital communications without restriction to the amount of data that may be transmitted, via an FSK-modulated non-propagating magnetic field emanating from a modulating source and sensed by an associated demodulating receiver. As a non-limiting example, the invention may be employed in a real time location system for locating and/or identifying transponder-tagged objects.

Pursuant to the present invention, the system employs an FSK transmitter unit having an analog section that generates and FSK-modulates the non-propagating magnetic field, and a digital section that converts incoming digital data into switch control signals. The switch control signals controllably switch capacitor components in circuit with a magnetic field coil, thereby modulating or changing the resonant frequency of an inductor-capacitor (LC) tank circuit, to effect FSK-modulation of the magnetic field in accordance with the digital data.

The magnetic field coil is small compared to the volumetric extent of its generated magnetic field, so that energy in the magnetic field is not propagated. Under supervisory digital control of a zero-crossing detector, that is coupled in parallel with the resonant LC tank circuit, a pumping switch is periodically operated in a fly-back manner, to provide a DC current boost to the magnetic field coil from its DC power supply, thereby compensating for resistive losses in the tank circuit. The pumping signal has a duration for a small fraction of a cycle of the resonant frequency of the magnetic field, and may be optimized for the intended range of operation of the generated field and the size of the coil.

Zero crossing points of the resonant frequency signal are supplied to a microcontroller for control of capacitor insertion switches of a multi-capacitor circuit, producing FSK modulation of the resonant magnetic field. During a calibration mode, vernier adjustment capacitors may be controllably switched in and out of the resonator tank circuit to determine optimum frequency matches for a desired FSK frequency pair. Thereafter, during actual data transmission, calibration-based 'best match' capacitors are switchably inserted in parallel with a base capacitor, to precisely define a pair of resonant frequencies associated with the binary states of the digital data. To FSK modulate the magnetic field, a data spreading code, such as a Manchester or other relatively short spreading code used for reduced complexity data communications, may be employed.

An alternate embodiment of the transmitter unit eliminates the multi-capacitor circuit and employs a microcontroller to generate and control pulse timing and duration used to pump the field coil. This approach requires accurate values of inductance and capacitance in the resonant circuit, but offers the advantage of reduced parts count, allowing its use in compact, portable applications. Since the microcontroller pumps the circuit every cycle, frequency error due to resonant circuit tolerance is pulled into correction on a cycle by cycle basis.

The voltage supplied to the fly-back configuration also offers a suitable power control mechanism. This approach is favored for large changes in power, as it allows the pulse width of the pump to be maintained at the proper width for high efficiency. A variable voltage regulator may be employed to effect this change. Also, the use of the variable voltage regulator affords inclusion of a power control loop by monitoring the voltage produced in the resonant circuit and adjusting the supply voltage to maintain it at a constant level. This provides constant communication performance when large metal objects such as automobiles or forklifts move in close proximity to the transmitting unit.

The receiver unit includes an LC tank detector circuit that includes a magnetic field-sensing coil in parallel with an associated capacitor. The LC tank circuit resonates at a frequency between the two FSK frequencies employed by the transmitter unit. The resonant detector circuit is coupled to a sense amplifier, which amplifies the voltage produced by the tank circuit for the desired receiver sensitivity and buffers the detected voltage to the appropriate logic level for use by a digital receiver/demodulator.

The digital receiver is referenced to a clock frequency that corresponds to the difference between the FSK frequencies of the selected modulation pair. The digital receiver contains two signal buffer paths, that operate on alternate sample periods, corresponding to one-half the period of the received data spread code, so that at least one of the two buffer paths will not be sampling data during transitions in the received FSK frequency. The output of the sense amplifier is coupled to the clock input of a frequency counter, whose contents are coupled to data inputs of first and second selectively enabled alternate sample latches. The count value in the frequency counter is cleared upon active reset, or when its sample enable input is not active. When enabled, the frequency counter is incremented by the rising edge of the change in the output of amplifier. At the end of the sample time, the contents of the frequency counter are clocked into one of the two latches, whose contents are clocked into the other latch.

Since the contents of a respective latch indicate the number of successive rising edges of the received signal within a prescribed measurement interval (sample time), they are representative of the frequency of the latched data. This count value is coupled to the digital demodulator and compared with each of two stored counts associated with the two valid FSK frequencies. If the latched count is representative of a valid frequency, it is transferred to the other latch for subsequent comparison with the next frequency-associated count. The difference between the two latched count values is coupled to a state machine, which demodulates the spreading code of the data. The demodulated data is buffered, so that it may be clocked out for validation of parameters such as preamble, cyclic redundancy check (CRC) code sequence and message length.

The state machine demodulates the data by comparing successive FSK tones with a predefined start-of-message sequence. Upon detecting this sequence, the state machine initializes the data demodulation circuitry, so that the data may be clocked out as it is detected and demodulated. As is customary in FSK-modulation systems, data values may be represented by respectively different sequences of the two FSK tones. Similar to detecting the start of a message, the state machine may detect the end of a message by comparing successively received FSK tones with a predefined end-of-message sequence. Upon detecting a valid end-of message sequence, the state machine returns the receiver's demodulation circuitry to its idle state.

DETAILED DESCRIPTION

Figure 1:
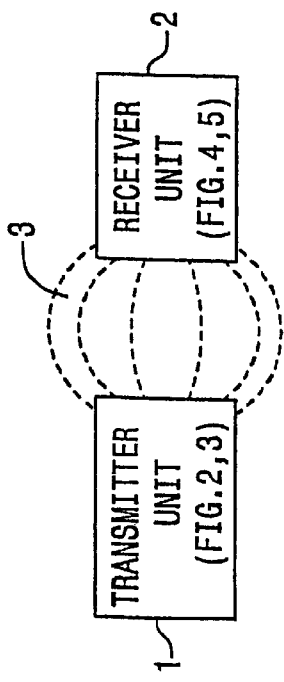
FIG. 1 diagrammatically illustrates the overall system configuration of a non-limiting, but preferred embodiment of the frequency shift keyed non-propagating magnetic field-based communication system of the present invention.

Before describing in detail the frequency shift keyed non-propagating magnetic field-based communication system of the present invention, it should be observed that the invention resides primarily in prescribed modular arrangements of conventional magnetic field generation and sensing components, in combination with digital communication circuits and associated digital signal processing components and attendant supervisory control circuitry therefor, that controls the operations of such circuits and components. In a practical implementation, these modular arrangements may be readily implemented using relatively compact analog field coils and associated capacitors, that are coupled with application specific integrated circuit (ASIC) chip sets, programmable digital signal processors, or general purpose processors.

Consequently, the configuration of such arrangements of circuits and components have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

FIG. 1 diagrammatically illustrates the overall system configuration of a non-limiting, but preferred embodiment of the frequency shift keyed non-propagating magnetic field-based communication system of the present invention, as comprising a transmitter unit 1 and a receiver unit 2, which are linked together by means of a non-propagating magnetic field 3 generated and FSK-modulated by the transmitter unit 1 and detected and demodulated by the receiver unit 2.

Figure 2:
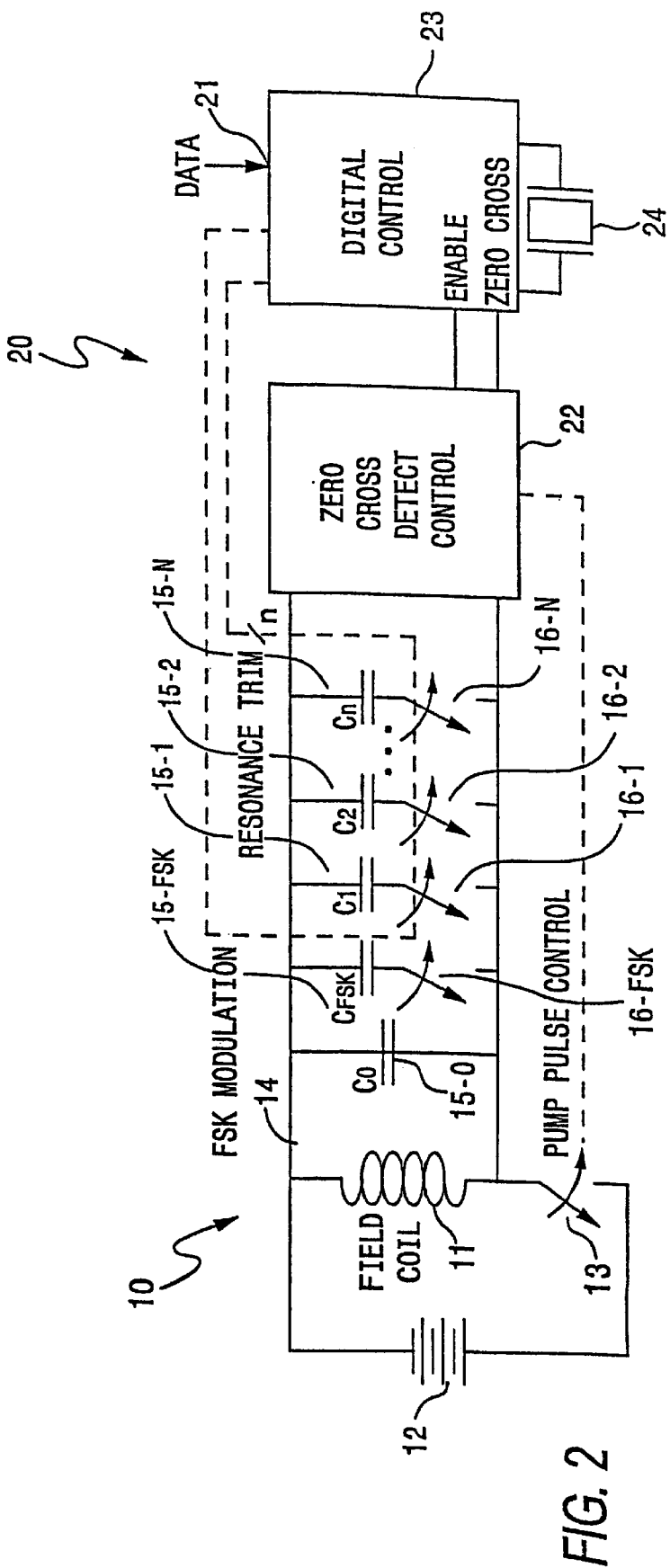
FIG. 2 shows a first embodiment of a transmitter unit that may be employed in the system of FIG. 1.

The transmitter unit 1 is operative to generate and FSK-modulate the non-propagating magnetic field 3 in accordance with modulation signals representative of digital data to be transmitted to the receiver unit. For this purpose, as shown in FIG. 2, the transmitter unit 1 comprises an analog section 10, which is configured to generate and FSK-modulate the non-propagating magnetic field, and a digital section 20 that is operative to convert an incoming digital data stream (DATA_IN) supplied to a transmitter input port 21 into switch control signals. These switch control signals are used to controllably switch the resonant frequency of magnetic coil—capacitor components of the analog section between first and second precisely calibrated or pre-tuned frequency values, and thereby effect FSK-modulation of the magnetic field in accordance with the digital data.

The analog section includes a magnetic field coil 11, relatively large amplitude energizing current for which is supplied by a DC power supply or battery 12, that is coupled to the coil by way of a 'pumping' switch 13. The magnetic field coil 11 is small compared to the volumetric extent of its generated magnetic field, so that the energy in the magnetic field is not propagated, but is physically confined about the axis of the coil, as in a typical solenoid architecture. Under supervisory digital control of a zero-crossing detector 22 coupled in parallel with a resonant ('tank' or 'ringing') circuit 14 formed by the field coil 11 and one or more capacitors 15-0–15-N, and 15-FSK of a capacitor circuit 15, the pumping switch 13 is periodically closed and opened in a fly-back manner, to provide a DC current boost to the coil 1 from the battery 12, in order to compensate for resistive losses in the ringing circuit 14.

The pumping signal generated by the zero crossing detector 22 provides for switch closure at or near the point at which the resonating current signal in the tank circuit crosses zero. This pumping signal has a duration for a small fraction of a cycle of the resonant frequency of the magnetic field, and may be optimized for the intended range of operation of the generated field and the size of coil 11. The zero crossing points of the resonant frequency are supplied to a supervisory microcontroller 23, for control of capacitor insertion switches of the capacitor circuit 15 and thereby FSK modulation of the resonant magnetic field.

More particularly, within the capacitor circuit 15, a first base frequency-defining capacitor 15-0 is hardwired electrically in parallel with the coil 11, while the remaining capacitors 15-FSK and 15-1–15-N are selectively connected in parallel with the coil 11 by the selective closure of respective series connected switches 16-FSK and 16-1–16-

N. The switches 16 may be implemented as digitally controllable electronic switch devices, such as, but not limited to field effect transistors (FETs), bipolar transistors, and the like. The selective closure of one or more of the switches 16 by the supervisory microcontroller 23 (e.g., in accordance with respective binary states of the digital data stream applied to input port 21) places one or more of the capacitors 15 in parallel with the base capacitor 15-0, so as to controllably lower or tune the resonant frequency of generated magnetic field.

In order to generate the FSK modulation switch control signals for application to the switches 16 of the magnetic field generator, the microcontroller 23 of the digital section 20 requires a clock signal as a modulation reference. For this purpose, a base frequency as defined by the coil 11 and the base capacitor 15-0 of the tank circuit 14 may be employed; alternatively, a separate, independent clock source, such as a crystal oscillator 24, may be used. In this latter case, the digital control section 20 may also adjust the resonant frequency to account for tolerances due to component variation or proximity of ferrous metals to the field coil 11.

For this purpose, capacitors 15-1, . . . , 15-N constitute additional, small valued capacitors that may be selectively coupled in parallel with the base capacitor 15-0 and/or an FSK capacitor 15-FSK by associated by-pass switches 16-1, . . . , 16-N, to provide for vernier tuning of the resonant frequency of the tank circuit 14. The independent clock source acts as a reference for the supervisory microcontroller 23 to measure the resonant frequency established by the tank circuit 14, at transmitter initialization and periodically thereafter. This ensures that the two resonant frequencies, namely, a first FSK resonant frequency F1 defined by field coil 1 and base capacitor 15-0 (plus any fine tuning by one of more of capacitors 15-1 and 15-N), and a second FSK resonant frequency F2 defined by field coil 1 and FSK capacitor 15-FSK (plus any fine tuning by one of more of capacitors 15-1 and 15-N) are within spec.

During a calibration mode, the vernier adjustment capacitors 15-1, . . . , 15-N may be controllably switched in and out of the resonator circuit 14 to determine the optimum frequency matches for the desired frequency pair. Thereafter, during data transmission, these 'best match' capacitors are switchably inserted in parallel with the base capacitor 15-0 and capacitor 15-FSK, as necessary, to define the resonant frequencies associated with the binary states of the digital data. As a non-limiting example of using the invention with a real time location system transponder tag, the pair of FSK frequencies F1 and F2 may correspond to F1=114.7 kHz and F2=147.5 kHz. These frequencies provide for low power and low cost receiver and demodulator components to be used.

Figure 3:
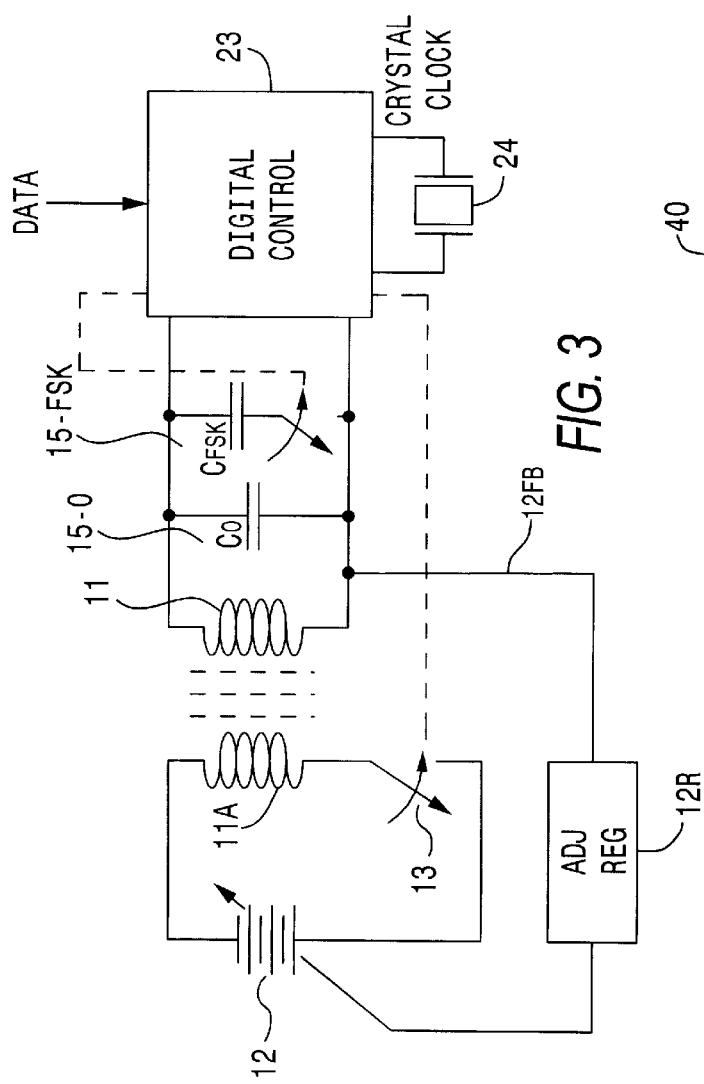
FIG. 3 shows an alternative embodiment of a transmitter unit that may be employed in the system of FIG. 1.

FIG. 3 shows a reduced hardware complexity embodiment of the transmitter unit, where microcontroller 23 of the digital section generates and controls the pulse timing and duration used to pump the field coil 11. The transmitter unit of FIG. 3 eliminates some of the analog circuitry at the cost of requiring accurate, temperature-stable components in the resonant LC network. This embodiment is preferred in small battery-operated and portable applications.

The analog portion 10 of the transmitter unit of FIG. 3 places a relatively low inductance auxiliary coil 11A in a transformer-coupled configuration with the high inductance field coil 11. The auxiliary coil 11A is coupled to the battery 12 through the pumping switch 13, selective closure of which is controlled directly by the microcontroller 23. Because the field generating tank circuit is now DC-isolated from the pumping switch, a relatively simple switch can be used.

Both transmitter embodiments, when employed in heavy industrial applications, benefit from a power control loop. This allows for correction of the magnetic field level, thereby maintaining communication performance, when the system is affected by the proximity of metal such as a passing automobile or forklift. For this, the power source 12 may be appropriately adjusted by a control signal generated by monitoring the level of the voltage present in the resonant LC circuit. The power source 12 may be controllably varied by means of an adjustable regulator 12R, wherein the detected resonant circuit voltage is fed back via a feed back link 12FB to the adjustment portion of the regulator 12R, to form a closed control loop.

Figure 4:
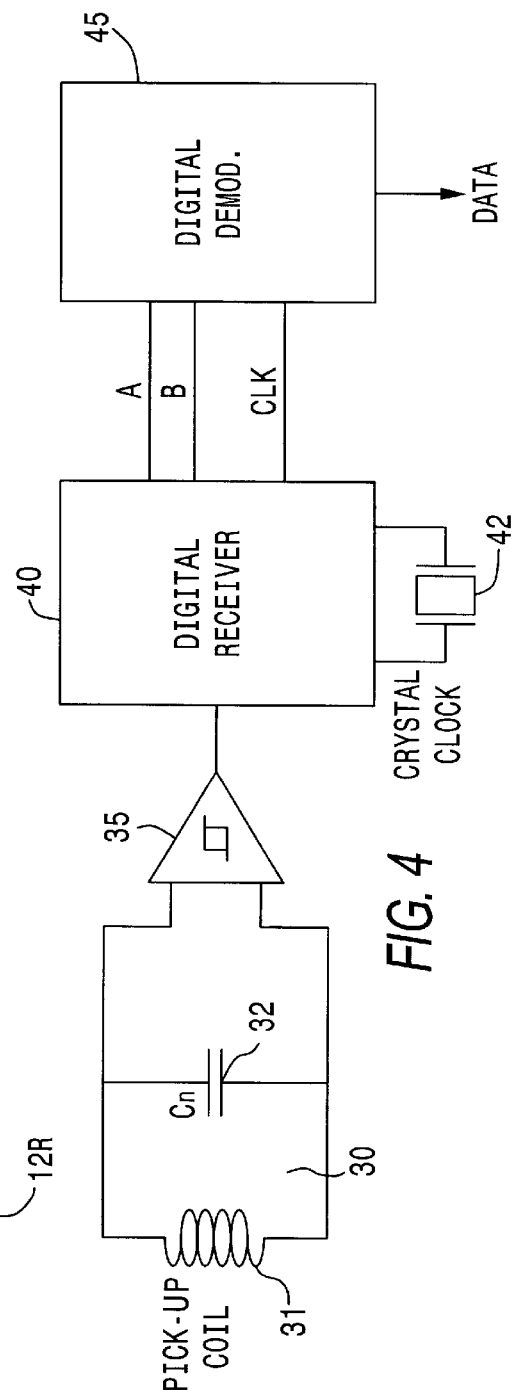
FIG. 4 diagrammatically illustrates the receiver unit of the system of FIG. 1.

The receiver unit of the system of FIG. 1 is illustrated diagrammatically in FIG. 4 as comprising a resonant (LC tank) detector circuit 30 that includes a magnetic field-sensing coil 31 coupled in parallel with an associated capacitor 32. The inductance-capacitance parameters of coil 31 and capacitor 32, respectively, are such that the tank circuit 30 resonates at a frequency between the two FSK frequencies employed by the transmitter unit. For the non-limiting example using frequencies of F1=114.7 kHz and F2=147.5 kHz, described above, the resonant frequency of the receiver tank circuit 30 may be 121 kHz.

The resonant detector circuit 30 is coupled to a sense amplifier 35, which amplifies the voltage produced by the receiver detector circuit for the desired receiver sensitivity and buffers the detected voltage to the appropriate logic level for use by a digital receiver 40, the output of which is coupled to a state machine-based demodulator 45. The digital receiver 40 is referenced to a prescribed receiver clock frequency $F_{RCLK}$, as may be supplied by a crystal clock 42. For the present example, the receiver clock is set to a frequency corresponding to the difference between the FSK frequencies of the selected modulation pair. For the current example of employing transmitter frequencies of 114.7 kHz and 147.5 kHz, the receiver clock $F_{RCLK}$ may be set at $F_{RCLK}$=32.8 kHz. This reduced clock frequency maintains very low power consumption at low cost. The use of such a relatively low clock frequency in the receiver requires a slower data rate, since one clock cycle of the receiver clock represents only 3.4–3.8 FSK clock cycles.

Figure 5:
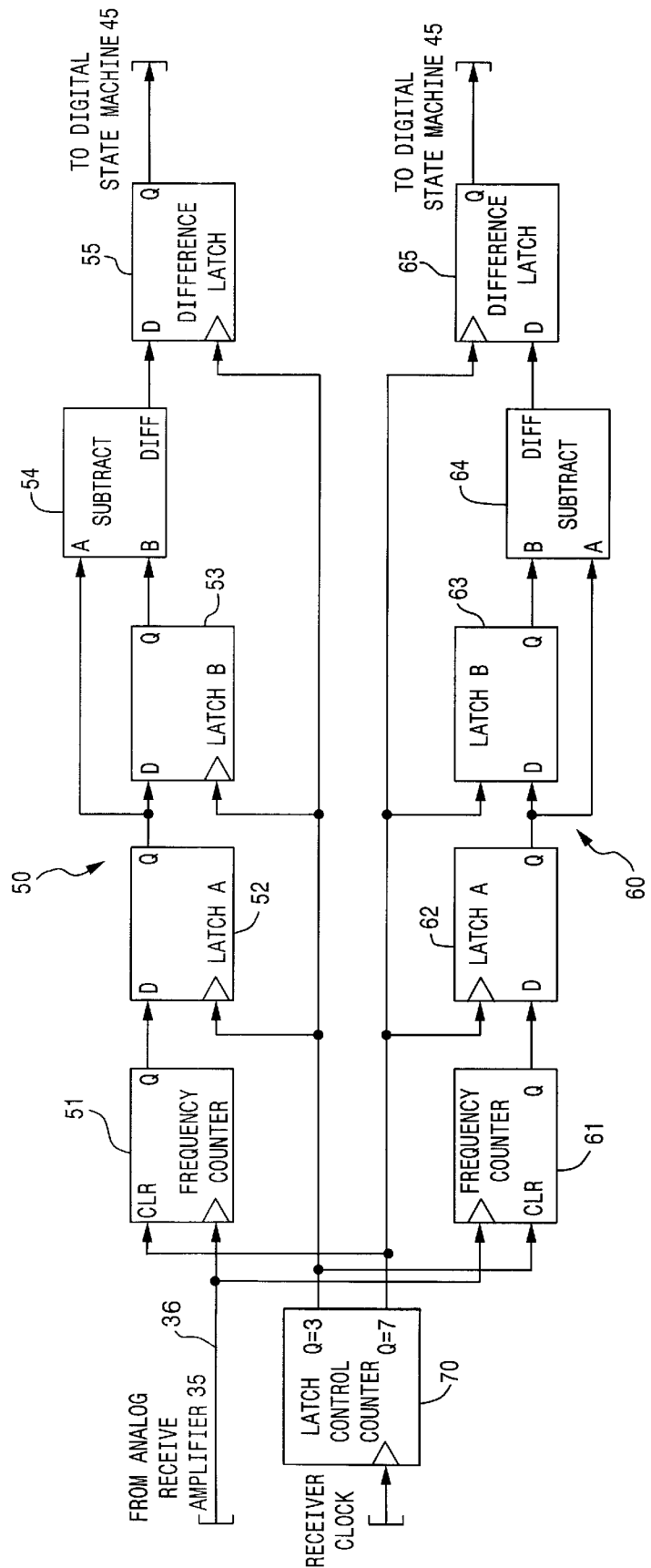
FIG. 5 diagrammatically illustrates the configuration of the digital receiver portion of the receiver of FIG. 4.

As diagrammatically illustrated in FIG. 5, the digital receiver contains two signal buffer paths 50 and 60, that operate on alternate sample periods that are one-half the period of the received data spread code. This ensures that at least one of the two buffer paths will not be sampling data during transitions in the received FSK frequency. As a non-limiting example, the data spreading code may comprise a Manchester (two-chip spreading) or other relatively short spreading code used for reduced complexity data communications. The receiver integration time is sufficiently long to provide for counting the number of rising edges in a received FSK signal, and readily differentiate between the two valid FSK frequencies (here, F1=114.7 kHz and F2=147.5 kHz), determine when a frequency change occurs, and reject other FSK signals and/or noise.

To this end, the output of the receiver unit's sense amplifier 35 is coupled over line 36 to clock inputs of each of a frequency counter 51 and 61, the contents of which are coupled to data (D) inputs of sample shift registers or A latches 52 and 62, that are respectively coupled in cascade with associated B latches 53 and 54. The contents of the frequency counters 51 and 61 are cleared or reset to zero, upon an active reset being applied from prescribed bit stages of a latch control counter 70 to their respective clear inputs CLR from prescribed bit stages. As a non-limiting example, latch control counter 70 may comprise an eight bit counter. As long as they are enabled, the contents of frequency counters 51 and 61 are modified (e.g., incremented) by the rising edge of the change in the output signal from sense amplifier 35.

The (eight-bit) latch control counter 70 is continuously clocked by the receiver clock $F_{RCLK}$=32.8 kHz, so that its contents are sequentially changed (e.g., incremented) and roll over. In the course of the contents of the latch control counter 70 being successively incremented by the receiver clock, the logical states of its respective Q=3 and Q=7 bits will eventually change (e.g., form a logical '0' to a logical '1'), so that clear or reset signals are periodically applied to the CLR inputs of frequency counters 51 and 61. For the non-limiting example of implementing the latch control counter by means of an eight-bit counter, its Q=3 and Q=7 bit stages to supply reset to the frequency counters provides for the above-referenced alternate sampling intervals for the two buffer paths 50 and 60.

The Q=3 and Q=7 bit stages of latch control counter are applied to the clock inputs of the various latches of the buffer paths 50 and 60. As a consequence, at the end of their alternate sample times, the contents of the frequency counters 51 and 61 are respectively transferred or clocked into their associated A latches 52 and 62; also, the current contents of the A latches 52 and 62 are clocked into the cascaded B latch 53 and 63, respectively.

Since the contents of A latches 52 and 62 indicate the number of successive rising edges of the received signal within a prescribed measurement interval (sample time), they are representative of the frequency of the latched data. These count values are coupled to respective A inputs of subtraction units 54 and 64, whose B inputs are coupled to the outputs of latches 53 and 63. The difference outputs DIFF provided by subtraction units 54 and 64 are coupled to the D inputs of respective difference latches 55 and 65. The difference latches 55 and 65, whose contents are coupled to a state machine within the demodulator 45, are clocked by the latch control counter 70, as described above.

Thus, as received frequency or tone-representative data output on line 36 from amplifier 35 is applied to counters 51 and 52, it successively increments their contents. Then, in the course of latch control counter 70 being sequentially incremented by the receiver clock, as the respective Q=3 and Q=7 bits of latch control counter 70 change to a logical '1', the latches of the respective signal buffer paths 50 and 60 are updated.

In particular, the contents of frequency counters 51 and 61, respectively, are loaded into the A latches 52 and 62, and the contents of the A latches 52 and 62, respectively are transferred to B latches 53 and 63, for comparison with the next tone (frequency) clocked into the A latches 52 and 62. Also, the difference latches 55 and 65 are clocked. The differences between the contents of latches 52 and 53, and between the contents of latches 62 and 63, as output by subtraction units 54 and 64 are coupled to the state machine, which demodulates the spreading code of the data. The demodulated data is then buffered, so that it may be clocked out for validation of parameters such as preamble, cyclic redundancy check (CRC) code sequence and message length.

As a non-limiting demodulation scheme, the state machine compares a received sequence of FSK tones with a predefined start-of-message sequence (corresponding to a start synchronization code). As a non-limiting example, the start-of-message sequence may comprise a plurality of successive samples at one FSK frequency or tone (such as three spreading chip periods at the higher of the two FSK tones), followed by a plurality of successive samples at the second FSK frequency (e.g., three spreading chip periods at the lower of the two FSK tones). For the example of three successive samples of one tone followed by three successive samples of the other tone, the difference between the contents of the respective A and B latches 52/62 and 53/63 would be the numerical sequence (0, 0,–N, 0, 0). Upon detecting this sequence, the state machine initializes the data demodulation circuitry, so that the data may be clocked out as it is detected and demodulated.

As is customary in FSK-based modulation systems, data values of '1' and '0' are represented by respectively difference sequences of the two FSK tones. As a non-limiting example, a logical 'one' may correspond to one spreading chip period at the higher FSK tone (147.5 KhZ) followed by one spreading chip period at the lower FSK tone (114.7 kHz); a logical 'zero' may correspond to one spreading chip period at the lower FSK tone (114.7 kHz), followed by one spreading chip period at the higher FSK tone (147.5 KhZ). For this example, the data bit sequence (00) would result in latch differences of (–N,+N); the data bit sequence (01) would result in latch differences of (0,+N); the data bit sequence (10) would result in latch differences of (0,–N); and the data bit sequence (11) would result in latch differences of (+N,–N). This allows a determination of the logic level provided at the output at the end of each sample period to be clocked out. It also provides for detection of any errors in format that may indicate corruption of the data.

Similar to detecting the start of a message, the state machine may detect the end of a message by comparing a received sequence of FSK tones with a predefined end-of-message sequence. As a non-limiting example, the end-of-message sequence may be complementary to the start-of-message sequence, described above. Namely, in the present example, an and-of-message sequence may comprise a three spreading chip periods at the lower of the two FSK tones), followed by three spreading chip periods at the higher of the two FSK tones) . In this case, the difference between the contents of the A and B latches would be the numerical sequence (0, 0, +N, 0, 0). Upon detecting a valid end-of message sequence, the state machine returns the receiver's demodulation circuitry to its idle state.

As will be appreciated from the foregoing description, the present invention provides a relatively compact, and reduced complexity communication system that FSK-modulates a non-propagating magnetic field for simplex digital communications, without restriction to the amount of data transmitted between a modulating source and an associated demodulating receiver. This makes the invention readily suited for real time location systems for locating and/or identifying transponder-tagged objects.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A communication system comprising:

a transmitter unit that is operative to generate and FSK-modulate a non-propagating magnetic field in accordance with modulation signals representative of digital data to be transmitted, said transmitter unit including a magnetic field producing-coil and one or more capacitors controllably switched in circuit with said magnetic field coil in accordance with said digital data, thereby changing the resonant frequency of an inductor-capacitor transmitter resonant circuit formed thereby, to effect FSK-modulation of said magnetic field; and a receiver unit including a magnetic field-sensing coil in circuit with an associated capacitor, forming a receiver resonant circuit that resonates at a frequency between FSK frequencies employed by said transmitter unit, and a digital receiver/demodulator, that is operative to detect valid FSK frequencies modulating said non-propagating magnetic field, and derives said digital data from valid detected FSK frequencies, with said digital receiver/demodulator being referenced to a clock frequency representative of a difference between FSK modulation frequencies, and including two signal sample paths that process alternate sample periods of one-half the period of the received data modulation, and produce output values from which said digital data can be recovered.

2. A communication system according to claim 1, wherein each of said signal sample paths is operative to count successive occurrences of a prescribed characteristic of respectively different portions of an output signal produced by said receiver resonant circuit for a prescribed duration, that is based upon a count total of clock signals of said referenced clock frequency, so as to provide respective sample path counts for determining receipt of valid FSK frequencies from said transmitter unit.

3. A communication system according to claim 2, wherein said digital receiver is configured to demodulate said digital data in accordance with a difference between count values of said signal sample paths.

4. A communication system according to claim 2, wherein said prescribed characteristic of respectively different portions of said output signal correspond to a prescribed edge portion of said output signal.

5. A communication system according to claim 1, wherein said transmitter unit is operative to FSK-modulate said non-propagating magnetic field by switchably placing respectively different sets of one or more capacitors each in circuit with said magnetic field coil in accordance with said digital data, in accordance with a prescribed spreading code modulation of said digital data.

6. A communication system according to claim 1, wherein said transmitter unit is configured to switchably place said respectively different sets of one or more capacitors in circuit with said magnetic field coil in accordance with zero crossing points of a resonant frequency signal produced by said inductor-capacitor transmitter resonant circuit.

7. A communication system according to claim 1, wherein said transmitter unit includes a pumping circuit that repetitively provides a current boost to said magnetic field coil from an associated power supply.

8. A communication system according to claim 7, wherein said transmitter unit includes a relatively low inductance auxiliary coil transformer-coupled with a high inductance field coil, said high inductance field coil being controllably switchably coupled in circuit with said one or more capacitors, and wherein said pumping circuit is coupled in circuit with said low inductance auxiliary coil.

9. A method for conducting communications by way of a non-propagating magnetic field, comprising the steps of:

(a) at a transmitter site, energizing a magnetic field coil to produce a magnetic field that does not propagate, and controllably interchanging plural sets of one or more capacitors each in circuit with said magnetic field coil, in accordance with a prescribed modulation format of digital data, thereby changing the resonant frequency of an inductor-capacitor transmitter resonant circuit formed therebetween, to effect FSK-modulation of said non-propagating magnetic field; and (b) at a receiver site, sensing, by means of a receiver resonant circuit containing a magnetic field-sensing coil in circuit with an associated capacitor, said receiver resonant circuit resonating at a frequency between FSK frequencies used to effect FSK-modulation of said non-propagating magnetic field in step (a), and digitally processing signals derived by said receiver resonant circuit to detect valid FSK frequencies modulating said non-propagating magnetic field, the digital processing being conducted in accordance with a clock frequency representative of a difference between FSK modulation frequencies, and including processing alternate sample periods of one-half the period of received data modulations by way of two signal sample paths and producing output values from which said digital data can be recovered, and demodulating said digital data from valid detected FSK frequencies.

10. A method according to claim 9, wherein each of said signal sample paths counts successive occurrences of a prescribed characteristic of respectively different portions of an output signal produced by said receiver resonant circuit for a prescribed duration, based upon a count total of clock signals of said referenced clock frequency, so as to provide respective sample path counts for determining receipt of valid FSK frequencies from said transmitter unit.

11. A method according to claim 10, wherein step (b) includes demodulating said digital data in accordance with a difference between count values of said signal sample paths.

12. A method according to claim 10, wherein said prescribed characteristic of respectively different portions of said output signal correspond to a prescribed edge portion of said output signal.

13. A method according to claim 9, wherein said prescribed modulation format corresponds to a prescribed spreading code modulation of said digital data.

14. A method according to claim 9, wherein step (a) comprises switching said respectively different sets of one or more capacitors in circuit with said magnetic field coil, in accordance with zero crossing points of a resonant frequency signal produced by said inductor-capacitor transmitter resonant circuit.

15. A method according to claim 9, wherein step (a) includes repetitively providing a current boost to said magnetic field coil from an associated power supply.

16. A method according to claim 15, wherein step (a) includes transformer-coupling a relatively low inductance auxiliary coil with a high inductance field coil, said high inductance field coil being controllably switchably coupled in circuit with said one or more capacitors, and wherein step (a) includes repetitively providing said current boost to said low inductance auxiliary coil, which is transformer-coupled thereby to said high inductance field coil.

* * * * *